(12) United States Patent
Miller, Jr.

(10) Patent No.: US 6,549,924 B1
(45) Date of Patent: Apr. 15, 2003

(54) FUNCTION GENERATING INTERPOLATION METHOD AND APPARATUS

(75) Inventor: Robert H Miller, Jr., Loveland, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/410,409

(22) Filed: Oct. 1, 1999

(51) Int. Cl.[7] .................................................. G06F 1/02
(52) U.S. Cl. ....................... 708/270; 708/276; 708/277
(58) Field of Search ................................ 708/270, 271, 708/272, 274, 273, 275, 276, 277, 290, 502, 510, 517, 605, 654

(56) References Cited

U.S. PATENT DOCUMENTS 5,604,691 A * 2/1997 Dworkin et al. ............ 708/277
6,349,319 B1 * 2/2002 Shankar et al. ............. 708/500

* cited by examiner

*Primary Examiner*—Chuong Dinh Ngo
(74) *Attorney, Agent, or Firm*—Alexander J. Neudeck

(57) ABSTRACT

An input number is applied to a look-up table that supplies three coefficients based upon certain bits of the input that define a series of bins. The first coefficient is fed directly to an adder that produces the output. The second coefficient is multiplied by a number corresponding to how far the input is from the edge of a bin. This number is then input to the adder that produces the output. The third coefficient is multiplied by a number that is the result of a curve-fit function of a number corresponding to how far the input is from the middle of a bin. This result is then input to the adder that produces the output. These three addends are aligned and summed to produce an output that corresponds within a certain precision of a chosen mathematical function of the input such as the mathematical inverse (1/x) or the mathematical inverse of the square root of the input.

18 Claims, 2 Drawing Sheets

FUNCTION GENERATING INTERPOLATION METHOD AND APPARATUS

FIELD OF THE INVENTION

This invention relates generally to computer arithmetic. More particularly, this invention relates to a circuit and method for calculating a mathematical function.

BACKGROUND OF THE INVENTION

One of the primary uses for computers and integrated electronics is to perform large numbers of mathematical operations very quickly. These operations may include mathematical function calculations such as $$\frac{1}{x}, \frac{1}{\sqrt{x}},$$

$e^x$, log x, etc. These operations are used in a large number of diverse tasks such as weather forecasting, electronic circuit modeling, beer brewing, and graphics rendering. Unfortunately, the demands being placed on many of these tasks continually pushes the performance of currently available hardware. For example, larger and more complicated weather models lead to weather forecasts that are more accurate. However, if the model doesn't complete running until after the period it was trying to forecast, the forecast is useless. Accordingly, a smaller, less complicated model is used so that it can complete its forecast in a useful amount of time on the available hardware. Forecasters may want to use the larger more complicated model, but the speed of the hardware prevents the practicality of this. A similar situation exists for many tasks performed by computers and integrated electronics. Therefore, there is a continuing need for faster and better ways to calculate mathematical unctions.

SUMMARY OF THE INVENTION

An embodiment of the invention utilizes quadratic interpolation to calculate a mathematical function. In a preferred embodiment, the functions $$\frac{1}{x} \text{ and } \frac{1}{\sqrt{x}}$$

and can be calculated to 24-bit precision from the same hardware. The major components of the hardware to calculate these functions is comprises a look-up table, two Booth-encoded multipliers and a curve-fit function generator. This arrangement allows for fast calculation of the function. This invention is also well adapted to fabrication in monolithic integrated circuits.

Calculating a function according to the present invention includes applying the input number to a look-up table that supplies three coefficients based upon certain bits of the input that define a series of bins. This first coefficient is fed directly to an adder that produces the output. The second coefficient is multiplied by a number corresponding to how far the input is from the edge of a bin. This number is then input to the adder that produces the output. The third coefficient is multiplied by a number that is the result of a curve-fit function input with a number corresponding to how far the input is from the middle of a bin. This result is then input to the adder that produces the output. These three addends are aligned and summed to produce an output that corresponds within a certain precision of a chosen function of the input.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
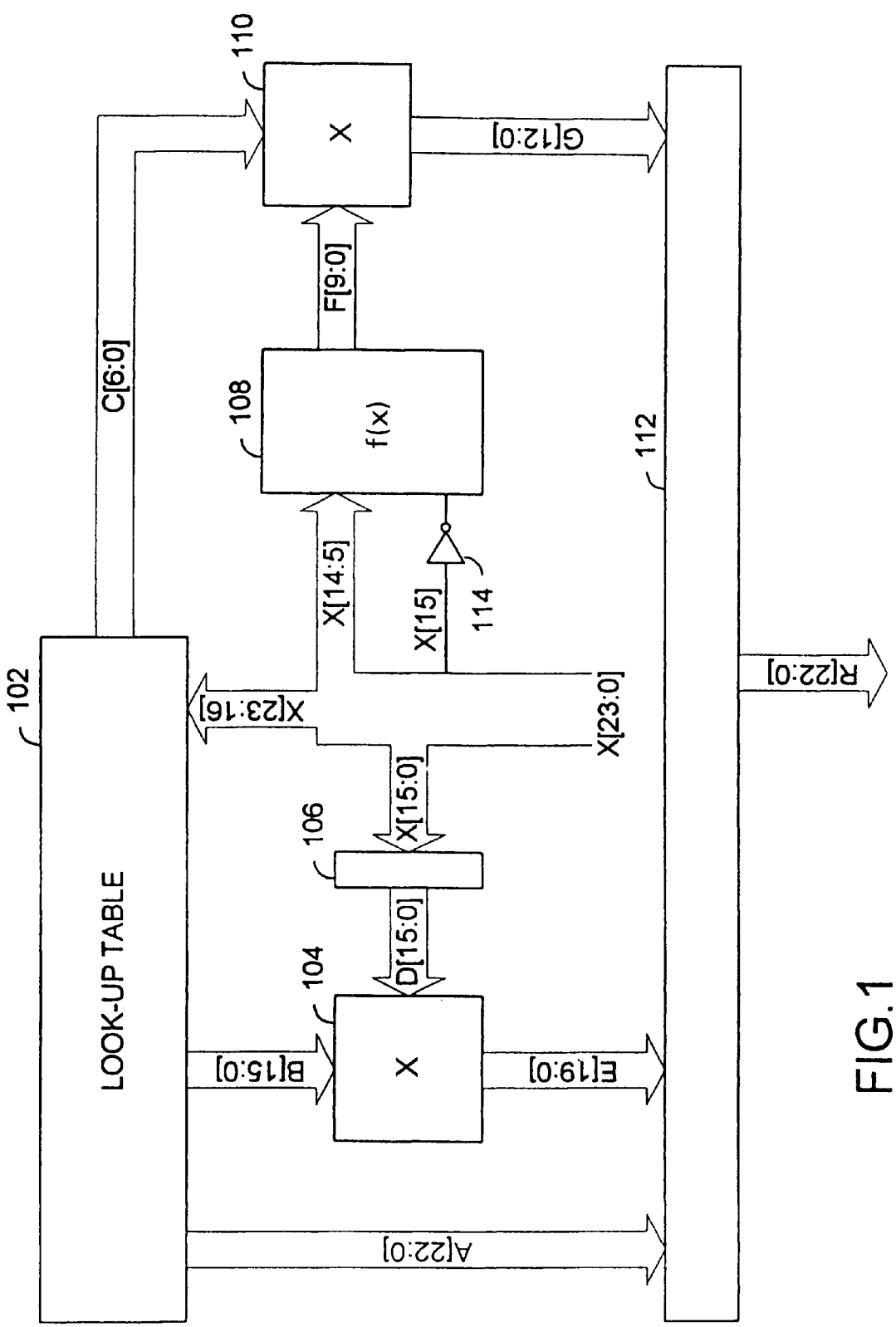
FIG. 1 is a block diagram illustrating the function calculator of the present invention.

FIG. 1 is a block diagram illustrating the function calculator of the present invention. In the preferred embodiment, the input operand, X, is a 24-bit fixed-point number, X[23:0]. It is understood that this number may be the significant of a floating point number the exponent of which may be processed in a manner consistent with the specific function(s) implemented. A number of the highest order bits of X are applied to look-up table 102. In the preferred embodiment, the highest order 8 bits of X are applied to a 256 entry look-up table, 102. Look-up table 102 produces three coefficients, A, B, and C. In the preferred embodiment, A is a 23-bit number, A[22:0]. B is a 16-bit number, B[15:0]. And C is a 7-bit number C[6:0]. A is applied directly to a first input of adder 112. B is applied to multiplier 104. The output of multiplier 104 is E which is applied to a second input of adder 112.

The other input of multiplier 104 is D[15:0] which is generated by a bitwise inversion of the bits not applied to look-up table 102. In the preferred embodiment, this is the lower order 16-bits of the input operand. In other words, the bits that are inverted to generate D[15:0] are X[15:0]. In addition, in the preferred embodiment, multiplier 104 is a Booth-encoded multiplier with the least significant carry-in input of the multiplier tied to a logical 1. Tying the least significant carry-in input of the Booth-encoded multiplier to logical 1, has the effect of incrementing the input by one least-significant bit. Dropping the higher order bits X[23:16], inverting the rest, and adding a least-significant bit before multiplying, has the effect of generating a two's-complement of X[15:0] which ends up being equivilent to subtracting X[23:16] from X[23:0].

In the preferred embodiment, multiplier 104 has two 16-bit inputs and a 20-bit output, E[19:0]. A 20-bit output was chosen to minimize the hardware required while still maintaining the monotonicity of the final result considering the function implemented and the precision of the curve-fit function used.

The third coefficient, C, is applied to a first input of multiplier 110. In the preferred embodiment, multiplier 110 has a 10-bit input, a 7-bit input, and a 13-bit output. The third coefficient, C[6:0], is applied to the 7-bit input of multiplier 110. The second input of multiplier 110 is driven by curve-fit function generator 108. The output of multiplier 110, G, is applied to a third input of adder 112. In the preferred embodiment, G is a 13-bit number, G[12:0].

In the preferred embodiment, curve-fit function generator 108 generates an approximate square of the input number and is implemented as a partial Booth-encoded multiplier. The partial Booth-encoded multiplier has M+1 fewer rows of Booth encoding and shifter-adder rows than a full Booth-encoded multiplier. The missing rows correspond to the M+1 least significant bits. This multiplier is applied to the rows of the partial Booth-encoded multiplier. In addition, the least significant bit of the multiplier (the Mth numbered bit of the original number when counting starts with the $0^{th}$ bit) is applied to the −1 bit input of the first Booth encoder. A multiplicand is generated by removing the Mth numbered bit of the original number, shifting the least significant M bits up by one bit, and placing a zero in the least significant bit position. This multiplicand is applied to the columns of the partial-Booth encoded multiplier to be shifted, added, and subtracted according to Booth's algorithm. The output of the partial Booth-encoded multiplier array is an approximate square of the input number. This implementation of a curve-fit function generator 108 that generates an approximate square is more fully described in related copending U.S. patent application Ser. No. 09/299,196 which is commonly owned by the assignee of the present document and is hereby incorporated herein by reference in its entirety into this document. This related application is entitled "METHOD AND APPARATUS FOR EFFICIENT CALCULATION OF AN APPROXIMATE SQUARE OF A FIXED-PRECISION NUMBER" and was filed Apr. 23, 1999, now U.S. Pat. No. 6,298,368.

An approximation of the square of the input number is used for the curve-fit function in the preferred embodiment. However, other functions and function generation hardware could be used. For example, an exact square function, or a trapezoidal function could be used. To use other functions and hardware, one skilled in the art would realize that appropriate adjustments to the input and output bit sets would be made to achieve a particular desired accuracy, performance, and use of hardware resources.

In the preferred embodiment, the input to the curve-fit function generator are the bits not applied to look-up table 102 with the highest order bit of these being inverted and minus lower order bits that are not significant. In the preferred embodiment, this is bits X[15:5] with bit X[15] being inverted before being applied to the curve-fit function generator as the highest order input bit. Inverting this highest order bit before squaring produces a number that reflects how far from the middle of the range of possible numbers the input number lies. In other words, one-half the largest possible number is subtracted from the input number before squaring. To illustrate by example, take a 6-bit number which would have a range from 0 to 63. If the most significant bit is inverted, then the smallest possible value $000000_2$ is translated into $100000_2 = -2^5 = -32$. The number very close to the middle of the possible values $100000_2 = 32$ would be translated into $000000_2 = 0$ and the number $111111_2 = 63$ would be translated into $011111_2 = 2^5 - 1 = 31$. This is the number that is applied to the curve-fit function generator.

The three inputs A, E, and G to adder 112 are summed by adder 112 to produce the result, R. In the preferred embodiment R is a 23-bit number R[22:0] reflecting the desired precision of the preferred embodiment.

In the preferred embodiment, the function being generated is $$F(x) = \frac{1}{x}.$$

Figure 2:
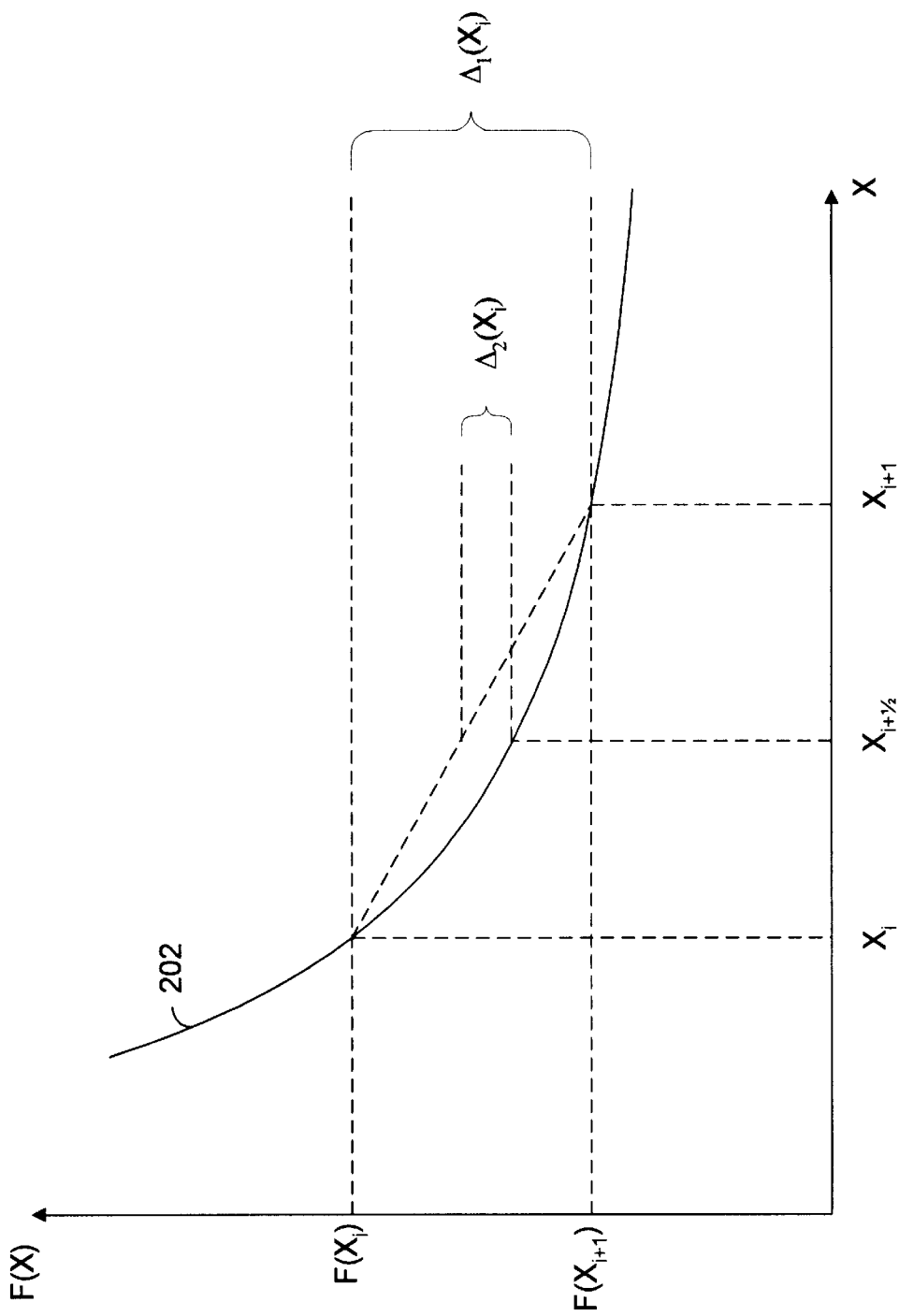
FIG. 2 is a plot of a function used to help illustrate how values in a look-up table in the preferred embodiment are selected.

Also, the preferred embodiment is generating the function for the mantissa of an IEEE style normalized format floating point number. Therefore the input number is a 23-bit fixed point number that is greater than or equal to one-half and less than one with the leading "1" bit being implied. Since the input, X, is of the range ½<=X<1 then the output, R, is also of limited range, 1<R<=2. FIG. 2 is a plot of a function used to help illustrate how the values A, B, and C in look-up table 102 are chosen in the preferred embodiment. In FIG. 2, $X_i$ corresponds to the value of the input values applied to look-up table 102, X[23:16], with zeros assumed for all bits of lesser significance. $X_{i+1}$ corresponds to the next value of the input values applied to look-up table 102, X[23:16], with zeros assumed for all bits of lesser significance. For example, if X[23:16] were $00000010_2$ (Note: this notation does not show the decimal point or the implied "1" of the normalized format. Also note that the implied "1" does not need to be applied to the look-up table since it never changes.), then $X_i$ would be $$\frac{1}{2} + \frac{1}{256} = 0.50390625$$

and $X_{i+1}$ would correspond to X[23:16]=$00000011_2$ which would be $$\frac{1}{2} + \frac{1}{256} + \frac{1}{512} = 0.505859375.$$

Likewise, $X_{i+\frac{1}{2}}$ corresponds to the value of $X_i$ with a "1" appended as an additional least significant bit. In other words, if X[23:16] were $00000010_2$ then $X_{i+\frac{1}{2}}$ would correspond to the value of $$000000101_2 = \frac{1}{2} + \frac{1}{256} + \frac{1}{1024} = 0.5048828125.$$

Illustrated in FIG. 2 are the factors $\Delta_1(X_i)$, $\Delta_2(X_i)$, and the function F(X). These factors and the value of the function F(X) at $X_i$ are used to determine the coefficients A, B, and C that are stored in look-up table 102 for a particular $X_i$. Solid line 202 illustrates the function F(X) plotted verses X. In the preferred embodiment $$F(x) = \frac{1}{x}.$$

A second embodiment similar to this plot has $$F(x) = \frac{1}{\sqrt{x}}.$$

The first coefficient, A, is selected as: $A = F(X_i) - \Delta_2(X_i)$. The second coefficient, B, is selected as:

$$B = \Delta_1(X_i) \cdot \left[ \frac{1}{X_{i+1} - X_i} \right].$$

The third coefficient, C, is selected as:

$$C = \Delta_2(X_i) \cdot \left[ \frac{1}{X_{i+\frac{1}{2}} - X_i} \right]^2.$$

The first factor $\Delta_1(X_i)$ is the difference between the function at $X_i$ and $X_{i+1}$. In other words, $\Delta_1(X_i) = F(X_i) - F(X_{i+1})$. The second factor $\Delta_2(X_i)$ is the difference, at $X_{i+\frac{1}{2}}$, between a line drawn between F(X) at $X_i$ and F(X) at $X_{i+1}$ and F(X). Expressed mathematically, this is:

$$\Delta_2(X_i) = \left[\frac{F(X_i) + F(X_{i+1})}{2}\right] - F\left(X_{i+\frac{1}{2}}\right).$$

Although several specific embodiments of the invention have been described and illustrated, the invention is not to be limited to the specific forms or arrangements of parts so described and illustrated. The invention is limited only by the claims.

What is claimed is:

1. A function calculator, comprising:
   a look-up table, said look-up table outputting a first coefficient, a second coefficient, and a third coefficient in response to a first set of input bits, said first set of input bits being a subset of a whole set of input bits;
   an adder, said adder producing a result that is the sum of a first number, a second number, and a third number, said first number being derived from said first coefficient, said second number being derived from the product of said second coefficient and a first translation of a second set of input bits, said second set of input bits being a subset of said whole set of input bits, and said third number being derived from the product of said third coefficient and a curve-fit function of a second translation of a third set of input bits, said third set of input bits being a subset of said whole set of input bits wherein said first translation is the two's-complement of said second set of input bits.

2. A function calculator, comprising:
   a look-up table, said look-up table outputting a first coefficient, a second coefficient, and a third coefficient in response to a first set of input bits, said first set of input bits being a subset of a whole set of input bits;
   an adder, said adder producing a result that is the sum of a first number, a second number, and a third number, said first number being derived from said first coefficient, said second number being derived from the product of said second coefficient and a first translation of a second set of input bits, said second set of input bits being a subset of said whole set of input bits, and said third number being derived from the product of said third coefficient and a curve-fit function of a second translation of a third set of input bits, said third set of input bits being a subset of said whole set of input bits wherein said second translation is the inversion of the most significant bit of said third set of input bits.

3. A function calculator, comprising:
   a look-up table, said look-up table outputting a first coefficient, a second coefficient, and a third coefficient in response to a first set of input bits, said first set of input bits being a subset of a whole set of input bits;
   an adder, said adder producing a result that is the sum of a first number, a second number, and a third number, said first number being derived from said first coefficient, said second number being derived from the product of said second coefficient and a first translation of a second set of input bits, said second set of input bits being a subset of said whole set of input bits, and said third number being derived from the product of said third coefficient and a curve-fit function of a second translation of a third set of input bits, said third set of input bits being a subset of said whole set of input bits wherein said first translation is the two's-complement said second set of input bits and said second translation is the inversion of the most significant bit of said third set of input bits and wherein said second set of inputs bits and said third set of inputs bits are the same bits.

4. The function calculator of claim 3 wherein said first set of input bits are more significant than said second set of input bits.

5. The function calculator of claim 4 wherein the contents of said look-up table are chosen to produce said result that is an approximation, to a predetermined number of significant bits, of the reciprocal of said whole set of input bits.

6. The function calculator of claim 4 wherein the contents of said look-up table are chosen to produce said result that is an approximation, to a predetermined number of significant bits, of the reciprocal of the square root of said whole set of input bits.

7. A method of function generation, comprising:
   looking-up a first coefficient, a second coefficient, and a third coefficient in response to a first set of input bits, said first set of input bits being a subset of a whole set of input bits;
   adding, a first number, a second number, and a third number to produce a result that is an approximation of the result of a mathematical function being performed on said whole set of input bits, said first number being derived from said first coefficient, said second number being derived from the product of said second coefficient and a first translation of a second set of input bits, said second set of input bits being a subset of said whole set of input bits, and said third number being derived from the product of said third coefficient and a curve-fit function of a second translation of a third set of input bits, said third set of input bits being a subset of said whole set of input bits wherein said first translation is the two's-complement said second set of input bits.

8. A method of function generation, comprising:
   looking-up a first coefficient, a second coefficient, and a third coefficient in response to a first set of input bits, said first set of input bits being a subset of a whole set of input bits;
   adding, a first number, a second number, and a third number to produce a result that is an approximation of the result of a mathematical function being performed on said whole set of input bits, said first number being derived from said first coefficient, said second number being derived from the product of said second coefficient and a first translation of a second set of input bits, said second set of input bits being a subset of said whole set of input bits, and said third number being derived from the product of said third coefficient and a curve-fit function of a second translation of a third set of input bits, said third set of input bits being a subset of said whole set of input bits wherein said second translation is the inversion of the most significant bit of said third set of input bits.

9. A method of function generation, comprising:
   looking-up a first coefficient, a second coefficient, and a third coefficient in response to a first set of input bits, said first set of input bits being a subset of a whole set of input bits;
   adding, a first number, a second number, and a third number to produce a result that is an approximation of the result of a mathematical function being performed on said whole set of input bits, said first number being derived from said first coefficient, said second number being derived from the product of said second coefficient and a first translation of a second set of input bits, said second set of input bits being a subset of said whole set of input bits, and said third number being derived from the product of said third coefficient and a curve-fit function of a second translation of a third set of input bits, said third set of input bits being a subset of said whole set of input bits wherein said first translation is the two's-complement of said second set of input bits and said second translation is the inversion of the most significant bit of said third set of input bits and wherein said second set of inputs bits and said third set of inputs bits are the same bits.

10. The method of claim 9 wherein said first set of input bits are more significant than said second set of input bits.

11. The method of claim 10 wherein the coefficients produced by said looking-up are chosen to produce said result that is an approximation, to a predetermined number of significant bits, of the reciprocal of said whole set of input bits.

12. The method of claim 10 wherein the coefficients produced by said looking-up are chosen to produce said result that is an approximation, to a predetermined number of significant bits, of the reciprocal of the square root of said whole set of input bits.

13. A function generator, comprising:
a look-up table, said look-up table outputting a first coefficient, a second coefficient, and a third coefficient in response to a first set of input bits, said first set of input bits being a subset of a whole set of input bits;
an adder, said adder producing a result that is the sum of a first number, a second number, and a third number, said first number being derived from said first coefficient;
a first multiplier, said first multiplier producing said second number, said second number being the result of said second coefficient and a first translation of a second set of input bits being input to said first multiplier, said second set of input bits being a subset of said whole set of input bits;
a second multiplier, said second multiplier producing said third number, said third number being the result of said third coefficient and a fourth number being input to said second multiplier;
a curve-fit function generator, said curve-fit function generator producing said fourth number from a third set of input bits, said third set of input bits being a subset of said whole set of input bits wherein said first translation is the two's-complement of said second set of input bits.

14. A function generator, comprising:
a look-up table, said look-up table outputting a first coefficient, a second coefficient, and a third coefficient in response to a first set of input bits, said first set of input bits being a subset of a whole set of input bits;
an adder, said adder producing a result that is the sum of a first number, a second number, and a third number, said first number being derived from said first coefficient;
a first multiplier, said first multiplier producing said second number, said second number being the result of said second coefficient and a first translation of a second set of input bits being input to said first multiplier, said second set of input bits being a subset of said whole set of input bits;
a second multiplier, said second multiplier producing said third number, said third number being the result of said third coefficient and a fourth number being input to said second multiplier;
a curve-fit function generator, said curve-fit function generator producing said fourth number from a third set of input bits, said third set of input bits being a subset of said whole set of input bits wherein said second translation is the inversion of the most significant bit of said third set of input bits.

15. A function generator, comprising:
a look-up table, said look-up table outputting a first coefficient, a second coefficient, and a third coefficient in response to a first set of input bits, said first set of input bits being a subset of a whole set of input bits;
an adder, said adder producing a result that is the sum of a first number, a second number, and a third number, said first number being derived from said first coefficient;
a first multiplier, said first multiplier producing said second number, said second number being the result of said second coefficient and a first translation of a second set of input bits being input to said first multiplier, said second set of input bits being a subset of said whole set of input bits;
a second multiplier, said second multiplier producing said third number, said third number being the result of said third coefficient and a fourth number being input to said second multiplier;
a curve-fit function generator, said curve-fit function generator producing said fourth number from a third set of input bits, said third set of input bits being a subset of said whole set of input bits wherein said first translation is the two's-complement of said second set of input bits and said second translation is the inversion of the most significant bit of said third set of input bits.

16. The function generator of claim 15 wherein said first set of input bits are more significant than said second set of input bits.

17. The function generator of claim 16 wherein the contents of said look-up table are chosen to produce said result that is an approximation, to a predetermined number of significant bits, of the reciprocal of said whole set of input bits.

18. The function generator of claim 16 wherein the contents of said look-up table are chosen to produce said result that is an approximation, to a predetermined number of significant bits, of the reciprocal of the square root of said whole set of input bits.

* * * * *